(12) United States Patent
Ramirez (10) Patent No.: US 7,058,523 B2
(45) Date of Patent: Jun. 6, 2006

(54) ELECTRICITY METER HAVING GAS CONSUMPTION CORRECTION PROCESSING

(75) Inventor: Anibal Diego Ramirez, Indianapolis, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 19 days.

(21) Appl. No.: 10/662,982

(22) Filed: Sep. 15, 2003

(65) Prior Publication Data

US 2004/0130459 A1 Jul. 8, 2004

Related U.S. Application Data

(60) Provisional application No. 60/410,550, filed on Sep. 13, 2002.

(51) Int. Cl.
*G01F 1/68* (2006.01)

(52) U.S. Cl. .......................... 702/61; 702/60; 702/100; 73/1.32; 73/861.27; 340/870.01

(58) Field of Classification Search .............. 702/57, 702/60–62, 64, 65, 117–118, 122, 124, 126, 702/182, 183, 186–188, FOR. 103, FOR. 111, 702/FOR. 112, FOR. 114, FOR. 135, FOR. 170–171; 340/870.02, 870.01, 870.09, 825.72, 825.69; 700/286, 291, 295, 277–278; 324/142, 110
See application file for complete search history.

(56) References Cited

U.S. PATENT DOCUMENTS

| 4,238,825 A | | 12/1980 | Geery |
|---|---|---|---|
| 4,804,957 A | * | 2/1989 | Selph et al. ............ 340/870.03 |
| 4,829,449 A | * | 5/1989 | Polesnak et al. ............... 702/45 |
| 4,918,995 A | * | 4/1990 | Pearman et al. ......... 73/861.02 |
| 4,953,386 A | * | 9/1990 | Pearman et al. ............. 73/1.27 |
| 4,965,756 A | * | 10/1990 | Pearman et al. ............ 702/100 |
| 5,343,758 A | * | 9/1994 | Ingrain et al. ........... 73/861.02 |
| 5,544,089 A | | 8/1996 | Hemminger et al. |
| 5,644,090 A | * | 7/1997 | Spendel .................... 73/861.27 |
| 6,121,158 A | | 9/2000 | Benchikha et al. |
| 6,874,691 B1 | * | 4/2005 | Hildebrand et al. ........... 236/51 |
| 2004/0173091 A1 | * | 9/2004 | Belke et al. ...................... 95/1 |

FOREIGN PATENT DOCUMENTS

EP 393859 A * 10/1990

* cited by examiner

Primary Examiner—Carol S. W. Tsai
(74) Attorney, Agent, or Firm—Maginot, Moore & Beck (57) ABSTRACT

A metering arrangement includes a meter housing, a source of energy signals, a source of gas flow signals, a source of temperature signals, and a processing circuit. The meter housing is securedly supported proximal to a facility receiving utility commodities. The processing circuit is disposed within the meter housing, and is operably connected to the source of energy signals, the source of gas flow signals, and the source of temperature signals. The processing circuit is operable to generate electrical energy consumption metering information from the energy signals. The processing circuit is further operable to generate corrected gas consumption information based on the received gas flow signals and the received temperature signals.

20 Claims, 5 Drawing Sheets

ELECTRICITY METER HAVING GAS CONSUMPTION CORRECTION PROCESSING

This application claims the benefit of U.S. Provisional Patent Application Ser. No. 60/410,550, filed Sep. 13, 2002.

1. Field of the Invention

The present invention relates to metering arrangements, and more specifically, to metering arrangements for measuring consumption of utility commodities.

2. Background of the Invention

Many utility service providers use meters to track usage of a commodity, such as gas, water or electricity, by customers. For example, natural gas utility service providers deliver natural gas to customers via a flow meter that measures the approximate quantity of gas being consumed by the customer. The gas utility then uses the meter information to generate billing information. The electrical service utility similarly delivers electrical power to customers through meters that measure energy consumption.

Meters are often installed in locations in which they are exposed to the weather and the elements, and therefore must be durable. Meters also must be securely installed to discourage and inhibit tampering. Tampering with meters is dangerous and can result in theft. In addition, for several reasons, meters must be self-contained, and do not typically include or relay on ordinary external power cords. As a result, gas and water meters are predominantly self-contained mechanical devices that require no electrical power.

For example, a typical gas meter employs a flow measurement device that generates mechanical energy to turn numerical gears, which in turn are mechanically coupled to digital counter wheels. The digital counter wheels constitute an accumulator that provides an ongoing count of gas "units" being consumed. One problem with using flow measurements to represent consumption is that measuring flow does not accurately reflect actual consumption of natural gas (or other kinds of gas) that expand or contract dependent on temperature and/or pressure. It is well known that the relationship between gas flow and true caloric gas consumption varies as a function of gas temperature and pressure.

In general, gas utilities address the inaccuracy by attempting to regulate gas pressure and temperature to increase the reliability of the flow measurement as an indication of actual gas consumption. Gas utilities then effectively convert gas flow measurements into gas consumption information by assuming that the gas pressure and temperature are these predetermined, regulated values.

Increasingly, however, there has been interest in providing more accurate gas consumption measurements by adjusting raw gas flow measurements based on the actual temperature and (sometimes) the actual pressure within the conduit that delivers the gas. Several gas meter correctors have been developed that generate adjust raw gas flow measurements to take into account these factors. Examples include that disclosed in U.S. Pat. No. 4,238,825, which describes a self-contained correction unit operable in conjunction with a gas meter that corrects the actual gas volume for prevailing conditions of temperature and/or pressure.

A drawback to these gas flow correctors such as the one described in U.S. Pat. No. 4,238,825 is that they require an independent electrical power source. In particular, gas flow correctors use electrical circuitry to perform the correction and thus require bias power for the circuitry. It is inconvenient to provide electrical bias power within a gas meter, and would either require an external power plug or an internal battery. Batteries are inconvenient because they need to be changed from time to time, and external power plugs are not usually located proximal to the places in which gas meters are installed.

At least in part as a consequence of the above described inconveniences, the use of corrected gas flow readings for utility gas consumption measurement has not been widely implemented. Even where it has been implemented, the solutions have drawbacks. There is a need, therefore, for an alternative method of generating accurate gas consumption measurements that avoids one or more of the drawbacks described above.

SUMMARY OF THE INVENTION

The present invention addresses the above-described need, as well as others, by providing a metering arrangement in which an electricity meter processing circuit calculates corrected gas flow measurements based on gas flow measurements from a traditional gas meter. Because an electricity meter already includes inherent sources of electrical power, the electricity meter processing circuit may be used to perform many calculations, including corrected gas flow calculations. Preferably, generic data inputs on the utility meter are used to receive the gas flow information, temperature information and/or pressure information.

One embodiment of the invention is a metering arrangement that includes a meter housing, a source of energy signals, a source of gas flow signals, a source of temperature signals, and a processing circuit. The meter housing is securely supported proximal to a facility receiving utility commodities. The processing circuit is disposed within the meter housing, and is operably connected to the source of energy signals, the source of gas flow signals, and the source of temperature signals. The processing circuit is operable to generate electrical energy consumption metering information from the energy signals. The processing circuit is further operable to generate corrected gas consumption information based on the received gas flow signals and the received temperature signals.

Optionally, the processing circuit is further operably connected to receive pressure signals, and is operable to generate corrected gas consumption information based on the received gas flow signals, the received temperature signals, and the received pressure signals.

Another embodiment of the invention is a metering arrangement that includes a meter housing, a source of energy signals, first and second pulse signal inputs, and a processing circuit. The meter housing is securely supported proximal to a facility receiving utility commodities. The first pulse signal input is supported by the meter housing and is operable to receive gas flow signals representative of gas flow through a gas conduit to the facility. The second pulse signal input is supported by the meter housing and operable to receive temperature signals representative of a temperature corresponding to the gas conduit. The processing circuit is disposed within the meter housing, and is operably connected to the source of energy signals to receive energy signals therefrom. The processing circuit is further operably connected to the first pulse signal input and the second pulse signal input. The processing circuit is operable to generate electrical energy consumption metering information from the energy signals. The processing circuit is also operable to generate corrected gas flow information based on signals received at the first pulse signal input and the second pulse signal input.

The above described features and advantages, as well as others, will become more readily apparent to those of ordinary skill in the art by reference to the following detailed description and accompanying drawings.

DETAILED DESCRIPTION

Figure 1:
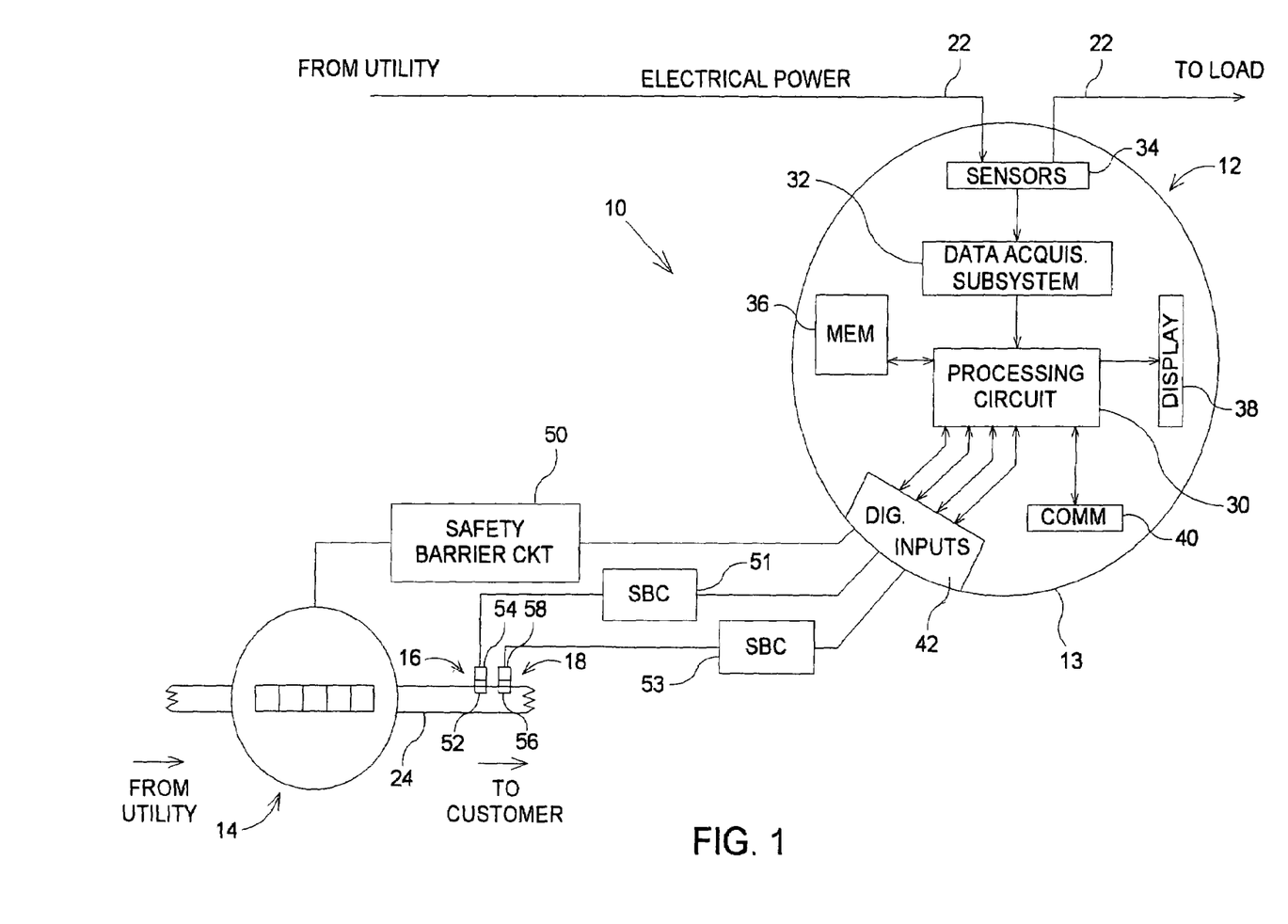
FIG. 1 shows an exemplary metering arrangement in accordance with the present invention.

FIG. 1 shows an exemplary metering arrangement 10 according to the present invention. The metering arrangement includes an electricity meter 12 operably connected to utility power lines 22 as described below to measure and store electrical energy. The metering arrangement 10 further includes a gas meter 14 operably connected to a gas conduit 24 as is known in the art to measure and store gas flow. In the embodiment described herein, the metering arrangement 10 also includes a temperature sensor 16 and a pressure sensor 18. However, as will be discussed further below, it will be appreciated that the metering arrangement 10 need not include both the temperature sensor 16 and the pressure sensor 18.

The electricity meter 12 has a housing 13 that supports a processing circuit 30, a data acquisition subsystem 32, a set of sensors 34, a memory 36, a display 38, a communication circuit 40, and a set of digital inputs 42. The housing 13 may suitably be a structural container that provides a physical barrier between exposed high voltages which may be present on one or more of the elements of the meter 12. The housing 13 is also configured to inhibit tampering with elements of the meter 12. Many suitable housing structures are well known in the art.

The set of sensors 34 includes one or more voltage and current sensors that generate voltage and current detection signals. The voltage and current detection signals are representative of the voltage and current waveforms being delivered through the power lines 22 to the load. Several suitable types of voltage and current sensors exist. By way of non-limiting example, voltage sensors may comprise voltage dividers or voltage transformers, while suitable current sensors can include embedded coils, current transformers, and shunts.

Figure 2:
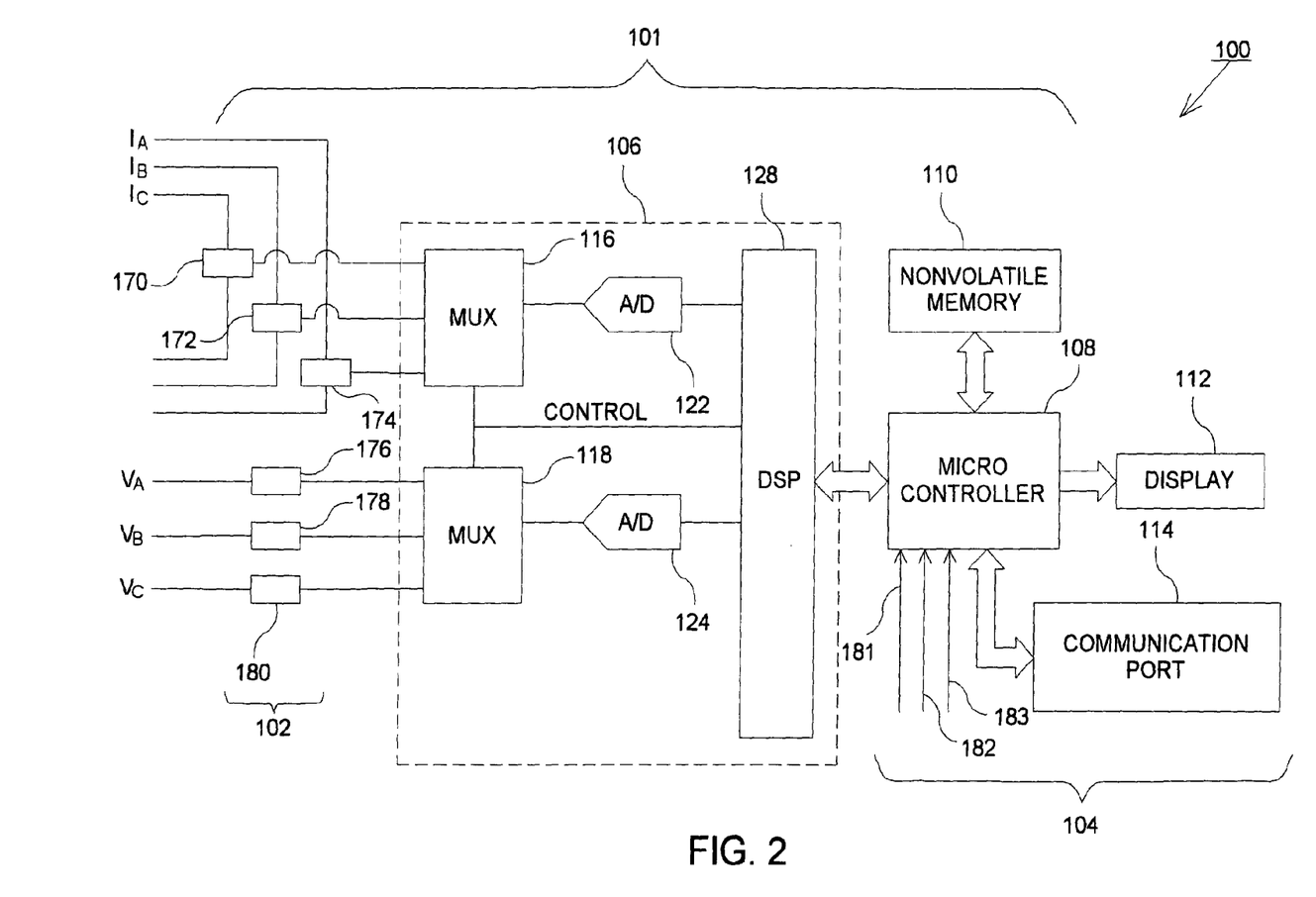
FIG. 2 shows an exemplary electricity meter according to the present invention which may be used as the electricity meter of FIG. 1.

The data acquisition subsystem 32 is a circuit that receives voltage and current detection signals and uses those signals to generate energy consumption information, typically in digital form. The energy consumption information may be representative of energy consumed, voltage, current, average power factor and other common energy consumption data. The energy consumption information may be in the form of a pulses, each pulse representative of a quantum of energy consumed, or may be in the form of digital words having an energy consumption value. In many meters, the data acquisition subsystem 32 includes some form of analog-to-digital ("A/D") converter and a digital signal processor. FIG. 2, discussed below shows an exemplary conversion circuit 106 that may be used as the data acquisition subsystem 32. Other examples are shown in U.S. Pat. Nos. 6,121,158 and 5,544,089, both of which are incorporated herein by reference.

The processing circuit 30 is preferably a programmable processing device and its associated interface and clocking circuitry. The processing circuit 30 is operable to receive energy consumption information and generate metering information that is provided externally through the communication circuit 40, the display 38, or both. For example, the processing circuit 30 generally accumulates the energy consumption information over long periods of time and presents the information on the display 38 so that a meter reader (or even the consumer) can track energy usage. The processing circuit 30 may perform specialized billing functions such as those associated with so-called demand metering or time-of-use metering, which are well known in the art.

The processing circuit 30 preferably has the ability to monitor multiple processes contemporaneously. In particular, the processing circuit 30 has the ability to generate the energy metering information as well as perform gas consumption correction operations as described herein. It is noted that the speed and power of even the most rudimentary commercially available processors is sufficient to handle the functions described herein contemporaneously. In particular, the power and gas consumption information received by the processing circuit 30 is provided as relatively low frequency signals, as compared to, for example, digital video, audio and other applications processing circuits are regularly required to perform. As a consequence, implementation of contemporaneous gas consumption and electricity consumption calculations as described herein may readily be carried out by most commercial microprocessors and/or microcontrollers, including, by way of example, a K0 Series microcontroller available from NEC.

The digital inputs 42 are inputs that can receive digital information, often in the form of pulses, and provide the pulse information more or less directly to the processing circuit 30. In other words, the digital inputs 42 generally do not include an A/D converter that transforms an analog voltage level into a multibit digital word. The digital inputs 42 may include protective and/or analog buffering circuit, but other wise pass input pulse signals directly the processing circuit 30.

In general, many available meters, including the S-4 Meter available from Landis+Gyr Inc., include so-called KYZ inputs that may be used as the digital inputs 42. The KYZ inputs and corresponding KYZ outputs are intended for use with load control operations. Load control operations allow the meter to turn off certain devices within the customer premises under certain circumstances. The KYZ inputs allow for external devices to provide some information to the meter, which the processing circuit can use to determine whether a particular device should be turned off or on. While KYZ inputs are widely available on electricity meters, they are not always used. One exemplary embodiment of the invention contemplates use of the KYZ inputs as digital inputs 42 in the gas consumption correction calculation operation. However, it will be appreciated that other or additional digital inputs may be used as the digital inputs 42.

The gas meter 14 may be any of a number of widely available gas flow meters that produce a digital pulse output that has a frequency that is representative of flow. In general, the digital pulse output is representative of an uncorrected gas consumption quantity. The gas meter 14 generates the pulses based on accumulated flow measurements over time. The consumption measurement is based on the accumulated flow measurement, and, as is known in the art, assumes that the gas in the conduit 24 is at a certain temperature and pressure. The assumed gas temperature and gas pressure are referred to as reference temperature and reference pressure, respectively.

As discussed further above, gas consumption measurements based solely on the output of the gas meter 14 are prone to error when the actual gas temperature and/or pressure is not equal to the reference gas temperature and/or pressure. This output of the gas meter 14, which is actually representative of gas flow within the conduit 24, is provided to the digital inputs 42 through a safety barrier circuit 50. The safety barrier circuit 50 is a device that provides a barrier from large voltages and currents from passing from the electricity meter 12 back to the gas meter 14. The safety barrier circuit 50 thus inhibits sparking or arcing in the gas meter 14, which is a critical safety protection.

Figure 3:
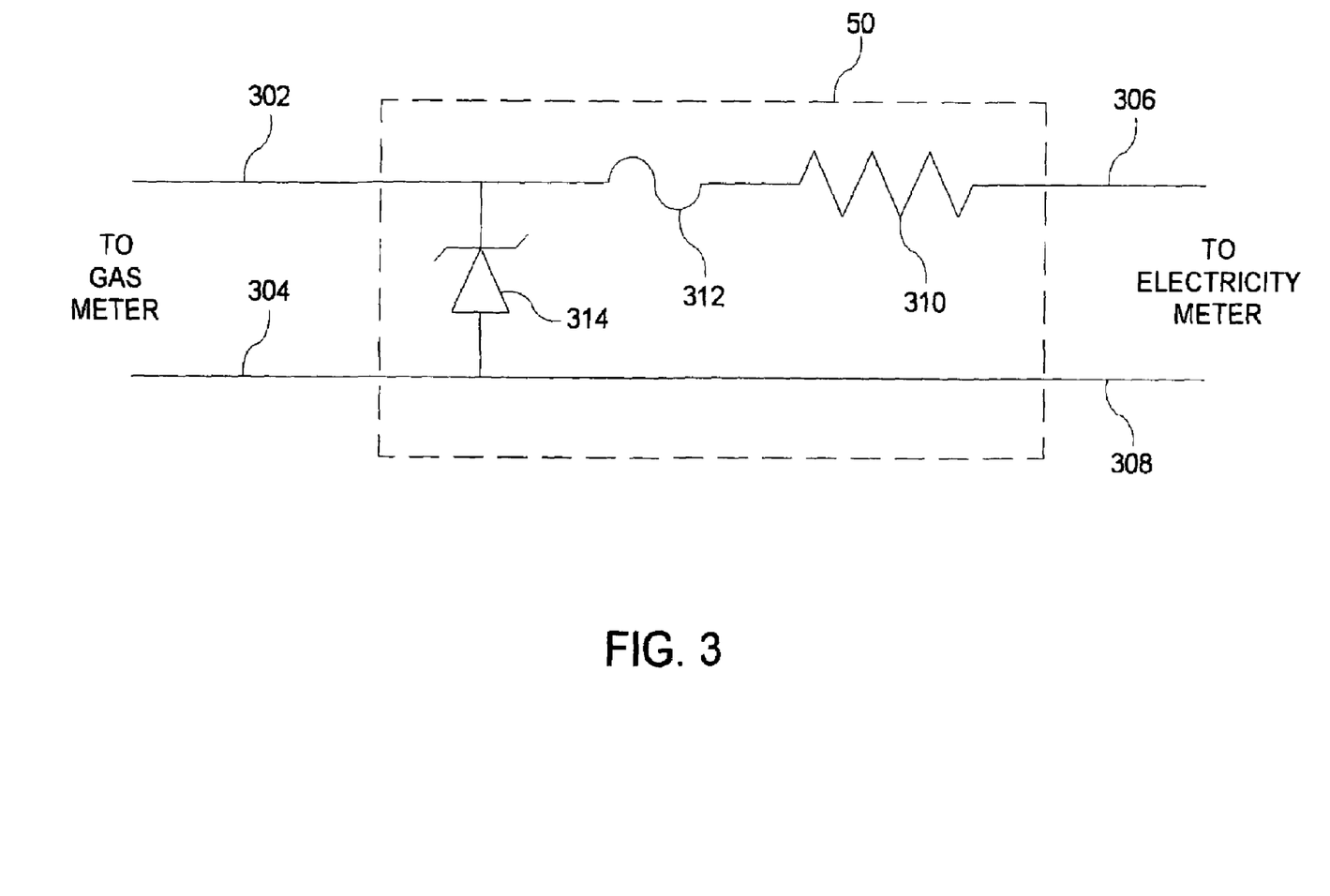
FIG. 3 shows an exemplary embodiment of a safety barrier circuit that may be used in the metering arrangement of FIG. 1.

While the safety barrier circuit 50 may take many forms, an exemplary safety barrier circuit 50 that is both economical and efficient is shown in FIG. 3 and discussed below.

The temperature sensor 16 is a device that is configured to provide an output that is representative of the temperature in the vicinity of the sensor 16. In the embodiment described herein, the temperature sensor 16 is disposed in a position in which it generates an output signal that is representative of the temperature inside the gas conduit 24. The temperature sensor 16 is ideally placed within the gas conduit 24. If the sensing apparatus of the sensor 16 cannot conveniently be placed within the gas conduit 24, it should at least be placed in the vicinity of the conduit 24, which should provide a temperature measurement that corresponds approximately with the temperature within the conduit 24.

In the exemplary embodiment described herein, the temperature sensor 16 includes an analog temperature measurement device 52 and a digital pulse conversion circuit 54. The temperature measurement device 52 may suitably be an HP series Thermometer Detector available from Honeywell Process Control Division of Fort Washington, Pa. In general, temperature measurement devices including the HP series thermometer detector generate an output that is an analog signal having a magnitude representative of the temperature. Because the digital inputs 42 expect a digital pulse input in the embodiment described herein, the digital pulse conversion circuit 54 converts the analog output signal the temperature measurement device 52 into a pulse signal having a frequency that corresponds to the magnitude of the input signal, and thus a frequency that corresponds to the detected temperature. The digital pulse conversion circuit 54 may suitably be an AD650 voltage-to-frequency converter available from Analog Devices, of Norwood, Mass.

The output of the digital pulse conversion circuit 54 is operably connected to one of the digital inputs 42. If the temperature measurement device 52 is disposed within the conduit 24, then the digital pulse conversion circuit 54 should be connected to the digital input 42 via a second safety barrier circuit 5 1.

The pressure sensor 18 is a device that is configured to provide an output that is representative of the atmospheric pressure in the vicinity of the sensor 18. In the embodiment described herein, the temperature sensor 18 is disposed in a position such that it generates an output signal that is representative of the pressure inside the gas conduit 24. The sensing apparatus of the sensor 18 should be disposed within the gas conduit 24. In the exemplary embodiment described herein, the pressure sensor 16 includes an analog pressure measurement device 56 and a digital pulse conversion circuit 58. The pressure measurement device 56 may suitably be a strain gauge or similar device, such as the SPT 4V series pressure transducer available from Sensym/ICT of Milpitas, Calif. In general, pressure transducers including the SPT 4V series transducers generate an output that is an analog signal having a magnitude representative of the atmospheric pressure. Because the digital inputs 42 expect a digital pulse input in the embodiment described herein, the digital pulse conversion circuit 58 is provided to convert the analog output signal the pressure measurement device 56 into a pulse signal having a frequency that corresponds to the magnitude of the input signal, and thus a frequency that corresponds to the detected pressure. The digital pulse conversion circuit 58 may suitably be similar to the digital pulse conversion circuit 54, discussed above.

The output of the digital pulse conversion circuit 54 is connected to the digital inputs 42 through another safety barrier circuit 53.

In operation, the customer, not shown, generally receives electrical energy via the power lines 22 and receives natural gas via the gas conduit 24. The sensors 34 generate voltage and current detection signals that are representative of the voltage and current waveforms being delivered through the power lines 22 to the customer. The sensors 34 provide the voltage and current detection signals to the data acquisition subsystem 32. The data acquisition subsystem 32 receives the voltage and current detection signals and uses those signals to generate energy consumption information. The data acquisition subsystem 32 provides the energy consumption information from time to time to the processing circuit 30.

Contemporaneously, the gas meter 14 detects gas flow through the conduit 24 and generates a gas flow pulse signal representative thereof. In particular, the gas meter 14 generates a pulse signal that has a frequency that is proportional to the flow of gas through the conduit 24. The temperature sensor 16 also generates a temperature signal that is generally representative of the temperature in the vicinity of the conduit 24, and the pressure sensor 18 generates a pressure signal that is representative of the atmospheric pressure within the conduit 24.

The processing circuit 30 receives the energy consumption information and generates suitable metering information therefrom. As discussed above, the metering information may include accumulated kilowatt-hours, VAR-hours, VA-hours, RMS voltage, RMS current, demand metering information and other typical electricity metering values. The processing circuit 30 may store one or more of the metering information values in the memory 36, cause the display 38 to display one or more of the values, and/or effect external communication of the metering information values.

The processing circuit 30 furthermore receives the uncorrected gas flow signal from the gas meter 14. As is known in the art, the uncorrected gas flow signal is typically a pulse signal, with each pulse representative of a certain quantity of gas that has been consumed (i.e. flowed through the conduit 24). However, as discussed above, the gas meter 14 generates the signal in a manner that does not take into account gas concentration variance due to temperature and pressure. In particular, the mechanism in the gas meter 14 merely measures flow, and thus does not actually determine the actual caloric weight quantity of gas consumed. As also discussed above, prior art methods estimate the quantity of gas consumed (within the meter 14 or outside of the meter 14) by assuming that the gas is delivered at a known reference temperature and pressure. If the actual temperature and pressure is equivalent to the reference temperature and pressure, then the estimated gas consumption derived from the gas meter 14 will be largely accurate. However, if the actual temperature or pressure is different than the reference temperature or pressure, then the estimated gas consumption values will have inaccuracy.

Regardless, the processing circuit 30 receives the uncorrected gas flow information from the meter 14 through the barrier safety circuit 50. (See FIG. 3, discussed below).

The processing circuit 30 further receives the pulse temperature signal from the temperature sensor 16 and the pulse pressure signal from the pressure sensor 18. The processing circuit 30 then determines corrected gas flow information, preferably a corrected value representative of the volume of gas consumed, using the uncorrected gas flow value, the pulse temperature signals and the pulse pressure signals.

By way of example, the processing circuit 30 may determine a value representative of the actual temperature, $T_{Act}$, and a value representative of the actual gas pressure, $P_{Act}$, and use those values to "adjust" or correct the uncorrected gas flow (i.e. estimated gas consumption) value, $G_{Meas}$. It is noted that since the measured quantity of gas $G_{Meas}$ presupposes that the temperature is a known reference temperature $T_{Ref}$ and the pressure is a known reference pressure $P_{Ref}$, the actual gas consumption value may be generated from the estimated gas consumption value (i.e. the uncorrected flow measurement) using ratios of the actual temperature and pressure to the reference temperature and pressure. Specifically, the corrected gas volume $G_{adj}$ is calculated using the following equation:

$$G_{adj}=G_{Meas}(T_{Ref}/T_{Act})(P_{Act}/P_{Ref})$$

The processing circuit 30 accumulates the $G_{adj}$ values over time to provide gas volume consumption information from which usage may be periodically communicated externally, either via the communication circuit 40 or via the display 38. As with the electricity metering information, the gas volume consumption information may also be stored, particularly in non-volatile memory so that the information is retained in the event of a power interruption to the meter 12. To this end, at least part of the memory circuit 36 may comprise a non-volatile memory such as an EEPROM, or a battery-backed RAM.

Figure 4:
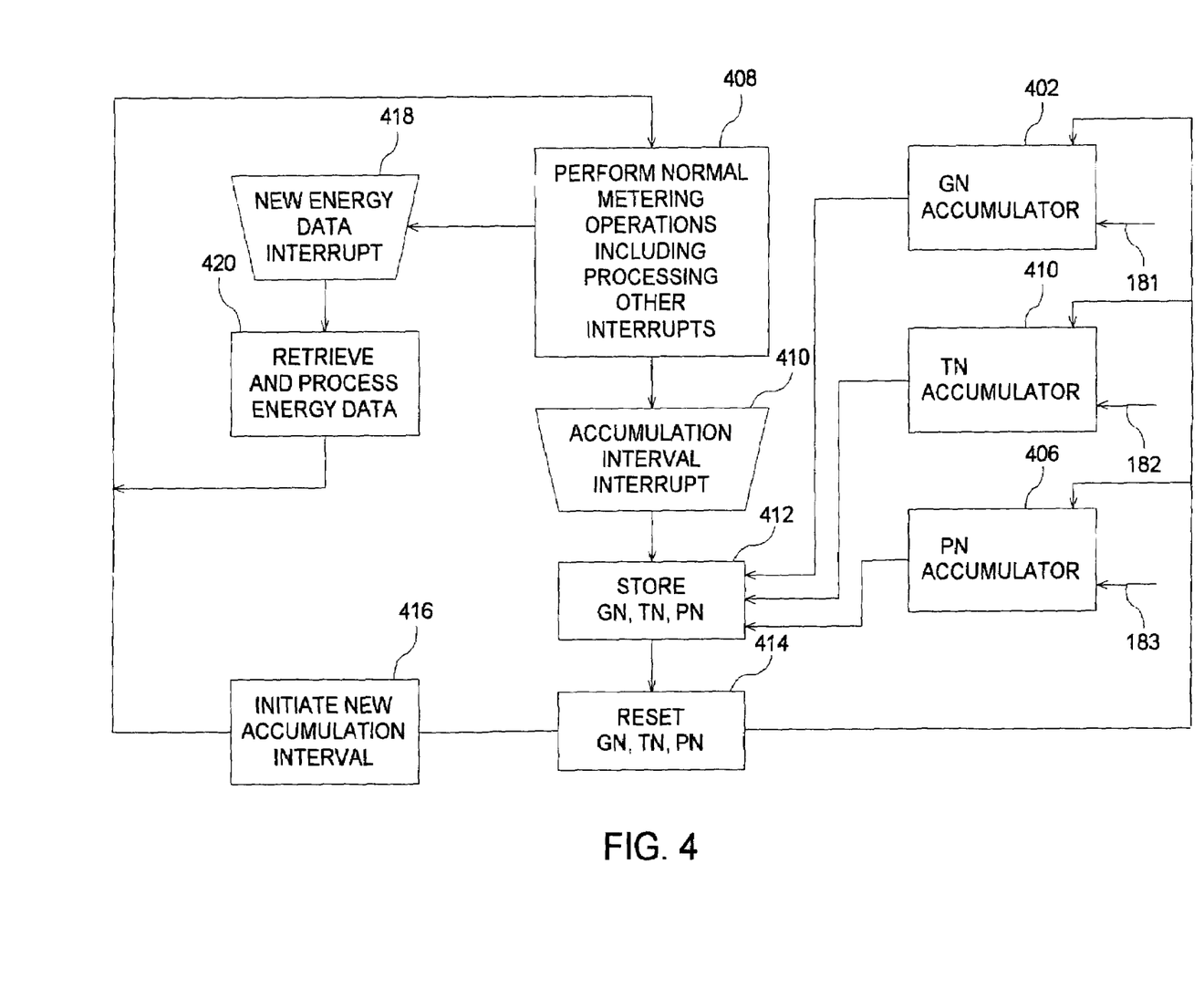
FIG. 4 shows an exemplary flow diagram of the normal runtime operations of the electricity meter of FIG. 2.
Figure 5:
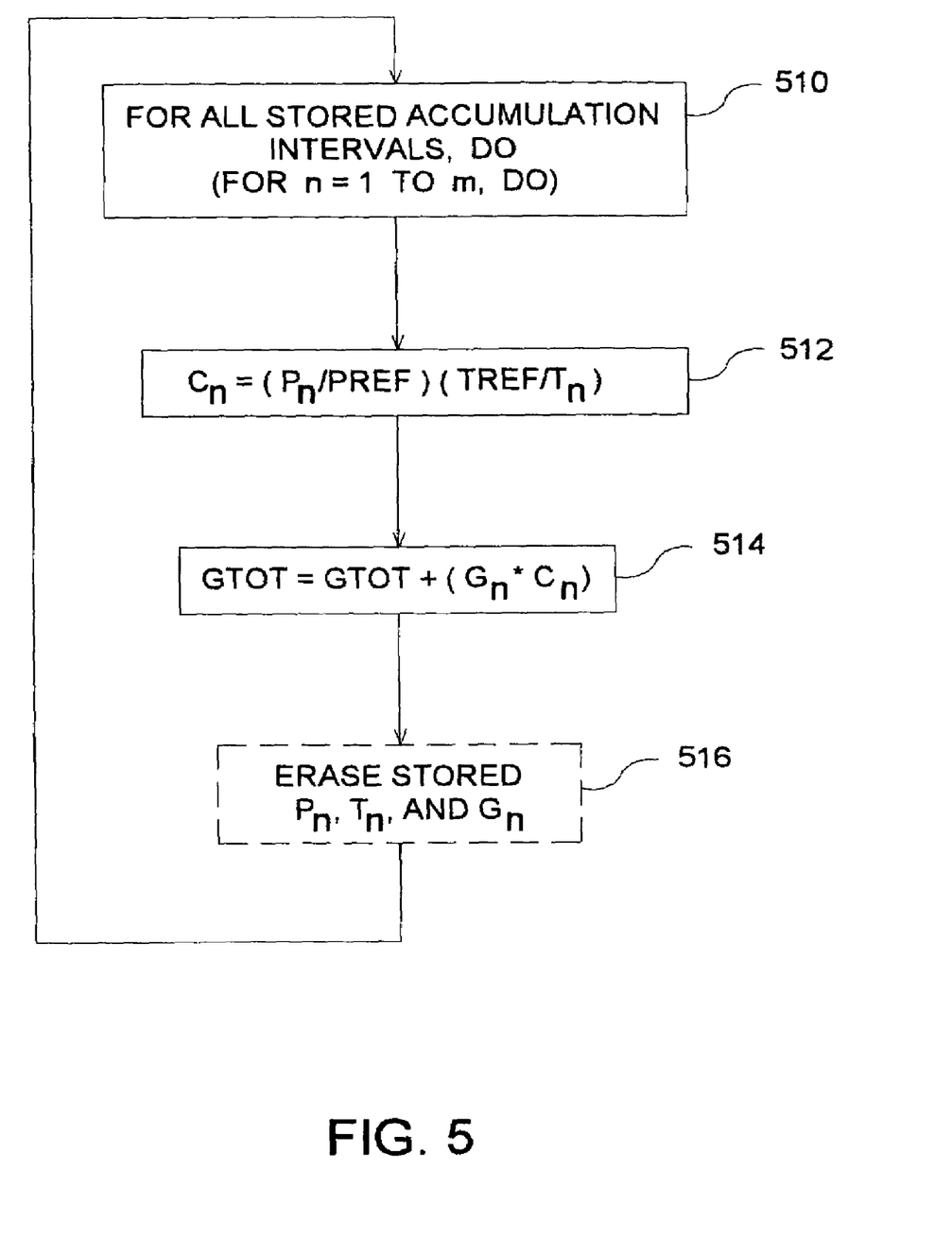
FIG. 5 shows an exemplary flow diagram of a gas consumption determination operation of the electricity meter of FIG. 2.

FIGS. 4 and 5, discussed further below, show in further detail an exemplary set of operations the processing circuit 30 may use to generated gas consumption values concurrently with electricity metering operations in accordance with aspects of the invention.

FIG. 2 shows in further detail an exemplary embodiment of an electricity meter 100 that may be used as the electricity meter 12 of FIG. 1. In FIG. 2, the meter 100 includes the measurement circuitry 101 and control circuitry 104. The measurement circuitry 101 includes sensor circuitry 102 and a conversion circuit 106. According to an exemplary embodiment, the measurement circuitry 101 also includes the microcontroller 108 and a nonvolatile memory 110. However, as shown in FIG. 2, the microcontroller 108 and the nonvolatile memory 110 are also included in the control circuitry 104. The sensor circuitry 102 includes polyphase current sensors 170, 172 and 174, and polyphase voltage sensors 176, 178 and 180. The control circuitry 101 includes the microcontroller 108, the nonvolatile memory 110, a display 112, a communication port 114, and plural digital pulse inputs 181, 182 and 183. The conversion circuit 106 comprises a first multiplexer 116, a second multiplexer 118, a first analog-to-digital ("A/D") converter 122, a second A/D converter 124 and a digital signal processor ("DSP") 128. It will be noted that a three-phase electrical meter is given by way of example only. Those of ordinary skill in the art may readily adapt the inventive aspects of present invention to other types of meters, such as single phase or network meters.

The current sensors 170, 172 and 174 are each connected to receive signals indicative of the current flowing through one phase of a three phase the power line (i.e., phase A, phase B, and phase C). The current sensors 170, 172 and 174 of the exemplary embodiment described herein preferably each include transformers (not shown in FIG. 2), which are advantageously situated to detect current on each respective phase of the power line. The current sensors 170, 172 and 174 are further connected to the first multiplexer 116 of the conversion circuit 106.

The voltage sensors 176, 178 and 180 are each connected to the respective phase of the power line (i.e., phase A, phase B, and phase C) to obtain a voltage measurement therefrom. To this end, the voltage sensors 176, 178 and 180 may suitably comprise high resistance voltage dividers. The voltage sensors 176, 178 and 180 are further connected to the second multiplexer 118 of the conversion circuit 106.

The conversion circuit 106 is a circuit operable to receive polyphase voltage and polyphase current measurement signals and generate digital signals therefrom, the digital signals including a power consumption signal and voltage and current signals. In the exemplary embodiment described herein, the conversion circuit 106 comprises the first and second multiplexers 116 and 118, respectively, the first and second A/Ds 122 and 124, respectively, and the DSP 128. The above listed components of the conversion circuit 106 may suitably be incorporated onto a single semiconductor substrate. Such devices are well known and could include the Power Measurement Integrated Circuit found in a model S4 electrical utility meters available from Siemens Power Transmission and Distribution, Inc.

The controller 108 is operably configured to, and executes programming instructions to, receive the digital signals from the conversion circuit 106, monitor and record power consumption using the digital signals, and analyze the digital voltage and current measurement signals and associated phase angle data to determine whether one or more measurement errors is present. The controller 108 is further operable to receive pulse signals representative of gas flow, temperature and pressure from the digital inputs 181, 182 and 183, respectively, and generate a gas consumption value based on the gas flow, temperature and pressure information. The controller 108 may suitably be a K0 series microcontroller available from NEC. However, the controller 108 may alternatively comprise any other suitable processing device or circuit. The controller 108 generally includes firmware, or in other words, an integrated memory into which programming instructions are stored. Alternatively, the programming instructions may be stored in the nonvolatile memory 110.

The digital input 181 is operably connected to a source of gas flow pulses, or uncorrected gas consumption information. The source of gas flow pulses may suitably be a gas meter such as the gas meter 14 of FIG. 1. The digital input 182 is operably connected to a source of temperature information, the temperature information representative of the temperature of the gas within the gas flow being measured. The source of temperature information may suitably be the temperature sensor 16 of FIG. 1. The digital input 183 is operably connected to a source of pressure information, the pressure information representative of the atmospheric pressure of the gas within the gas flow being measured. The source of pressure information may suitably be the pressure sensor 18 of FIG. 1.

In operation, the current sensor circuits 170, 172 and 174 detect the phase A current, the phase B current, and the phase C current, respectively, and generate current measurement signals therefrom. The current sensor circuits 170, 172 and 174 may suitably generate the three phase measurement signals contemporaneously and continuously. The current sensor circuits 170, 172 and 174 provide the phase A, phase B and phase C measurement signals, respectively, to the first multiplexer 116. The current measurement signals typically have a voltage level that is indicative of the instantaneous current level on their respective phases. For current transformers designed for utility meter use, the current measurement signals measure from approximately 0.0 volts to 0.3volts maximum. Other scaling factors may of course be employed.

The first multiplexer 116, under the control of the controller 108, then provides the instantaneous current measurement signal from one of the phase A, phase B, or phase C current measurement signals to the first A/D converter 122. The first multiplexer 116 typically provides each phase in rapid succession of cycles, such that each phase is provided to the first A/D converter 122 every third cycle. According to the exemplary embodiment described herein, the first multiplexer 116 provides the current measurement signals to the first A/D converter 122 at a rate of 2721 Hz.

The first A/D converter 122 receives and samples or digitizes the rapid succession of instantaneous current measurement signals. The first A/D converter 122 then provides to the DSP 128 a stream of digital words, each representing the magnitude of one of the three phase currents at a particular instant.

Contemporaneously, the voltage sensor circuits 176, 178 and 180 detect the phase A voltage, the phase B voltage, and the phase C voltage, respectively, and generate voltage measurement signals therefrom. The voltage sensor circuits 176, 178 and 180 provide the phase A voltage measurement signal, the phase B voltage measurement signal, and the phase C voltage measurement signal, respectively, to the second multiplexer 118. Each voltage measurement signal is typically a signal having a voltage level that is indicative of the instantaneous voltage level on its respective phase. In the exemplary embodiment described herein, the voltage sensors are configured to provide voltage measurement signals that range from approximately 0.0 volts to 0.3 volts maximum. Other scaling factors may of course be employed.

The second multiplexer 118 then provides each phase voltage measurement signal in a rapid succession of sequences, such that each phase voltage is provided to the second A/D converter 124 every third step of the sequence. According to the exemplary embodiment described herein, the second multiplexer 118 provides the voltage measurement signals at the same rate as that used by the first multiplexer 116 to provide the current measurement signals to the first A/D converter 122. Moreover, the first multiplexer 116 and the second multiplexer 18 operate in a coordinated fashion to provide certain phase current measurement signals at the same time as certain phase voltage measurement signals. For example, in a four wire wye meter wiring configuration, the first multiplexer 116 provides the phase x current measurement signal and the second multiplexer 118 provides the phase x voltage measurement signal contemporaneously, where x rotates among A, B and C.

The second A/D converter 124 receives and samples or digitizes the rapid succession of instantaneous voltage measurement signals. The second A/D converter 124 thus provides to the DSP 128 a stream of digital words or samples, each representing the magnitude of one of the three phase voltage measurement signals at a particular instant. The first A/D converter 122 and the second A/D converter 124 thus provide the digital current and voltage measurement signals in a predetermined synchronous phase relationship. The DSP 128 within the conversion circuit 106 determines power consumption by selectively multiplying the digital voltage measurement signal samples and the digital current measurement signal samples received from the A/D converters 122 and 124, and then adding them together.

In particular, in a four wire wye meter wiring configuration, the appropriate power calculation is:

$$\text{POWER} = V_A I_A + V_B I_B + V_C I_C \quad (1)$$

The DSP 128 carries out the above calculation in the manner described herebelow. The DSP 128 receives from the A/D converters 122 and 124 a digital current measurement signal sample and a voltage measurement signal sample. The DSP 128 multiplies the received samples, and the resulting product is added to a running total or sum. The DSP 128 then receives the next set of digital current and voltage measurement signal samples and repeats the process. In other words, if $\text{DIG\_VOLT}_x$ is the digital voltage measurement signal for a phase x and $\text{DIG\_CURR}_x$ is the digital current measurement signal for the phase x, then the DSP 128 carries out the following calculation:

$$\text{POWER} = \text{SUM}(\text{DIG\_VOLT}_x * \text{DIG\_CURR}_x) \text{ for } x = \{A, B, C, A, B, \ldots\} \quad (2)$$

From time to time, the DSP 128 provides power consumption data derived from POWER to the controller 108. In the exemplary embodiment described herein, the DSP 128 provides the power consumption data three times per second.

Contemporaneously, the controller 108 receives gas flow pulses, temperature pulses and pressure pulses from the digital inputs 181, 182 and 183, respectively. Such pulses may be accumulated inside the controller 108, and then occasionally subjected to further processing to generate gas consumption information that is corrected for temperature and pressure. Further detail regarding such operations are provided below in connection with FIGS. 4 and 5.

The controller 108 also accumulates the electrical energy consumption data received from the DSP 128 until a predefined watt-hour threshold has been reached. At that point, the controller 108 generates a power consumption pulse and increments a power consumption counter. The power consumption counter is the number by which customer energy consumption is tracked. For example, as is well known, a utility may determine a particular customer's consumption for a particular billing cycle by subtracting the power consumption counter value at the beginning of the billing cycle from the power consumption counter value at the end of the billing cycle.

The controller 108 preferably provides the electrical energy consumption counter information to both the non-volatile memory 110 and the display 112. From time to time, the controller 108 may provide gas consumption information to the display 112. The display 112 then provides a visual representation of the power consumption counter information from which readings may be taken by utility personnel. To facilitate periodic display of gas as well as electrical energy information, the display 112 should include an indication that allows the reader to determine whether gas consumption information or electrical energy consumption information is being displayed.

The nonvolatile memory 110 stores the gas and energy consumption counter information for the purposes of retention in the case of a power interruption.

Optionally, the controller 108 further provides the energy and gas consumption counter information, as well as other information, to the communication circuit 114. The communication circuit 114 may then communicate the information over an external communication means, such as a public telephone network, to a central processing facility for the utility. Energy information may be sent to one utility, and gas information may be sent to another utility. In this manner, the utilities may track and bill for power and gas consumption registered by the meter 10 without requiring an employee to physically view the meter.

In addition to the calculations performed to generate gas and energy metering information, the controller 108 also generally controls the operation of the conversion circuit 106, and particularly, the first and second multiplexers 116 and 118, respectively, the first and second A/D converters 122 and 124, respectively, and the DSP 128.

Referring again to the DSP 128, the DSP 128 also determines and provides other information to the controller 108. In particular, the DSP 128 provides for each phase, the measured voltage magnitude and phase angle data, and the measured current magnitude and phase angle data. To determine the measured voltage and current magnitude data, the DSP 128 performs an RMS calculation on each digital voltage and current measurement signal. This calculation may for example, include, for each phase voltage and current, squaring each sample of the digital measurement signal, and taking the mean of the squared samples over time.

To determine phase angles for each voltage, the DSP 128 uses the time differences between the zero crossings of the phase voltage signals. The time difference between the zero crossing of a particular signal $V_x$ and the $V_A$ signal, plus the direction of the respective zero crossings, provides the phase information. Current phase information is determined using watts per phase and VAR per phase. In particular, a current phase angle for phase x is given by arctan ($VAR_x/WATTS_x$).

The DSP 128 provides the measured voltage and current magnitude and phase angle data to the controller 108. Table 1, below shows the measured values so provided.

TABLE 1

| |
| --- |
| $VRMS_A$ = Phase A voltage magnitude |
| $VRMS_B$ = Phase B voltage magnitude |
| $VRMS_C$ = Phase C voltage magnitude |
| $IRMS_A$ = Phase A current magnitude |
| $IRMS_B$ = Phase B current magnitude |
| $IRMS_C$ = Phase C current magnitude |
| $V<_A$ = Phase A voltage phase angle |
| $V<_B$ = Phase B voltage phase angle |
| $V<_C$ = Phase C voltage phase angle |
| $I<_A$ = Phase A current phase angle |
| $I<_B$ = Phase B current phase angle |
| $I<_C$ = Phase C current phase angle |

It is noted that the controller 108 may be required to perform some further conversion on the measured data to put it in the form identified in Table 1.

FIG. 3 shows an exemplary safety barrier circuit 50 that may be used in the arrangement 10 of FIG. 1. The design of the safety barrier circuit 50 of FIG. 3 may also be used for the safety barrier circuits 51 and 53 of FIG. 1. The barrier safety circuit 50 is generally connected on one side to the pulse line 302 and the ground line 304 that connect to the outputs of the gas meter 14, not shown in FIG. 3, and the pulse line 306 and the ground line 308 that connect to the digital inputs 42 of the electricity meter 12 (or inputs 181, 182 and 183 of the meter 100 of FIG. 2). As discussed above, the barrier safety circuit 50 is configured to prevent high instantaneous voltages from being fed back from the electricity meter 12 to the gas meter 14, where they could cause a spark or arc that ignites the gas flowing through the gas meter 14. Thus, as shown in FIG. 3, the barrier safety circuit 50 operates to suppress high voltages across lines 306 and 308 from propagating back to the lines 302 and 304.

To this end, the safety barrier circuit 50 includes a resistor 310 and a fuse 312 connected in series between the pulse lines 306 and 302, and a zener diode 314 connected across the pulse line 302 and the ground line 304. The zener diode 314 is has a breakdown voltage of 12V, which limits the potential between the gas meter lines 302 and 304. The fuse 312 is a 50 mA DC fuse that is designed to open in the presence of large currents, thereby preventing large currents from propagating back through lines 302 and 304 to the gas meter 14. The resistor 310 is a 1K ohm, ⅛ watt resistor that limits the current delivered to the gas meter 14 in the event of a component failure in the gas meter pulse output (or the temperature sensor 16 or pressure sensor 18 for circuits 51, 53 respectively).

It will be appreciated that other circuits that limit voltage and current, including minor or substantial modifications to the barrier safety circuit 50 of FIG. 3, may be used in place of the embodiment shown in FIG. 3.

FIG. 4 shows a flow diagram of an exemplary set of operations that may be performed by the controller 108 of FIG. 2, and indeed may be performed by the processing circuit 30 of FIG. 1, to generate energy metering signals and corrected gas consumption signals in accordance with aspects of the invention. It is assumed for the purposes of describing the operations of FIG. 4 that the digital inputs 181, 182 and 183 of FIG. 2 are connected to the gas meter 14 (via barrier circuit 50), the temperature sensor 16 and the pressure sensor 18, respectively.

In general, the controller 108 accumulates uncorrected or estimated gas consumption information from an ordinary gas meter, and further accumulates temperature information and pressure information, while also performing various energy metering operations and calculations contemporaneously. To this end, the controller 108 preferably has the capability to accumulate pulses received at an input while the operating system performs other main programming loop functions. Such capabilities are well known.

For example, the K0 microcontroller from NEC has the ability to accumulate pulse inputs and store the accumulated result in a register while the main program register executes other functions. To this end, the pulses from the gas meter 14 and the sensors 16, 18 provide pulses having a frequency of on the order of 10 Hz. The K0 Series microcontroller has a clock speed of on the order of 5 MHz. As a consequence, the K0 microcontroller may readily execute a short interrupt routine for each pulse received without significantly delaying microcontroller operations.

It will be appreciated that other microcontrollers have this capability, and that other circuits may be formed that involve one or more microprocessors and/or discrete components that can accumulate pulses while also performing other functions. Indeed, any high speed microprocessor (currently processors such as the PENTIUM IV®, which is a registered trademark of Intel Corporation, and routinely uses clock speeds in excess of 2 GHz) may suitably treat each input as a separate interrupt to the main program, increment a counter corresponding to the pulse, and then return to the main program until the next pulse is received.

In any event, there are a number of hardware embodiments capable of carrying out, in essence, the steps of FIG. 4. The steps of FIG. 4 show normal metering operations.

Referring now to FIG. 4, in steps 402, 404 and 406, the controller 108 accumulates pulses in each the respective accumulators GN, TN and PN. Each of the accumulators GN, TN and PN is associated with one of the digital inputs 181, 182 and 183. Specifically, the accumulator GN corresponds to the digital input 181 of the controller 108 that receives the gas consumption pulses from the gas meter 14, the accumulator TN corresponds to the digital input 182 of the controller 108 that receives the temperature pulses from the temperature sensor 16, and the accumulator PN corresponds to the digital input 183 of the controller 108 that receives the pressure pulses from the pressure sensor 18.

Steps 402, 404 and 406 occur contemporaneously with each other, and contemporaneously with the main process loop 408 of the controller 108. The contemporaneous accumulations of pulse counters and other processing operations may be carried out in various ways. In the exemplary embodiment described herein, each pulse causes an interrupt to the controller 108. Responsive to the interrupt, the controller 108 increments the appropriate software counter GN, TN or PN and then returns to normal operations.

The main processing loop 408 encompasses normal lower priority meter operations. Such operations may include the generation of energy metering information from energy data received from the DSP 128, the operation and control of displays, performance of diagnostics and other operations. One lower priority meter operation is the calculation of corrected gas consumption information from the stored GN, PN and TN values. FIG. 5 shows these operations in further detail. Details regarding the other various electricity metering operations are omitted for purposes of clarity of exposition of the invention. Those of ordinary skill in the art may readily determine the scope and implementation of specific energy metering operations without departing from the teachings of the invention.

During the course of lower priority metering operations, the controller 108 from time to time receives interrupts from higher priority operations. While the controller 108 may include multiple higher priority operations, including those discussed in connection with step 408, at least two of the higher priority operations relate to 1) the end of an accumulation interval for the registers GN, TN and PN, and 2) the reception of new energy consumption information.

The controller 108 may include a timer-driven interrupt that signals the end of an accumulation interval in step 410. The accumulation interval is a predetermined time period. In particular, as discussed above, the controller 108 from time to time obtains and stores the values of the accumulators GN, PN and TN. In the embodiment described herein, the controller 108 obtains and stores the values after a predetermined time period expires, referred to herein as the accumulation interval. A timer-driven interrupt may be used to signal to the processor that the current accumulation interval is over. The controller 108 may, for example, be configured to generate such an interrupt every 15, 30 or 60 minutes. Accumulation intervals of other lengths may be used.

If an interrupt occurs because the accumulation interval has ended (step 410), the processing circuit executes step 412. In step 412, the controller 108 obtains the current values GN, TN and PN from their respective accumulators and stores the values in memory. The controller 108 may store the values in internal RAM, or the nonvolatile memory 110, or another nonvolatile memory such as battery-backed RAM. The controller 108 may alternatively first convert one or more of the values GN, TN or PN to another form, or store further processed information, such as the correction value derived from PN and TN, discussed further below. However, one additional advantage of storing only the unprocessed accumulator values GN, TN or PN, is that the interruption cause by step 412 would be minimized. Because step 412 is a higher priority interruption to other metering operations, it may be preferable to minimize the operations of step 412, and allow further processing of the accumulator values to occur on a lower priority basis.

In any event, after step 412, the controller 108 proceeds to step 414. In step 414, the controller 108 resets all of the accumulators GN, TN and PN. Thus, although steps 402, 404, and 406 continue to operate contemporaneously during steps 408, 410, 412, and 414, the accumulators GN, TN and PN are reset once their current values are stored in memory.

After step 414, the controller 108 starts a new accumulation interval in step 416 and then returns to step 408. For example, a new timer interrupt value may be set. However, step 416 is not strictly necessary. In particular, instead of performing a function that specifically starts the accumulation interval, the controller 108 may alternatively operate to track the accumulation periods using pre-defined scheduled interrupts based on time values in a real-time clock maintained in the controller 108. Thus, each new accumulation interval automatically starts based on predefined clock limits.

The controller 108 also receives an interrupt when new energy consumption information is received from the conversion 106, step 418. In such a case, the controller 108 proceeds to step 420 to retrieve the energy consumption information and perform preliminary operations on the data, such as storing the data in appropriate registers. In the exemplary embodiment described herein, the received energy consumption data is received from the DSP 128 of FIG. 2. In the exemplary embodiment of FIG. 2, such data is typically provided to the controller 108 approximately three times per second. Exemplary types of energy consumption data are shown in Table 1, discussed further above.

After step 420, the controller 108 returns to step 408.

As discussed above, even the other functions of step 408 may be interrupt driven, such that display functions, for example, may periodically interrupt other main processing functions. Some other functions, not listed herein, may have a higher priority interrupt than those of steps 410 and 418. The number and priority of functions will necessarily vary depending on the needs and interests of the parties using the meter. In accordance aspects of the invention, however, the processing circuit receives and stores, gas consumption information, energy consumption information, gas temperature and gas pressure information. The controller 108 generally operates as shown in FIG. 4 in an ongoing manner during normal operation of the meter 100.

One of the normal metering operations of step 408 is the calculation of gas consumption information using the data stored in step 412. In this operation, the controller 108 uses the energy consumption information, temperature information and gas pressure information received in step 412 to generate corrected gas consumption information. FIG. 5 shows an exemplary flow diagram of operations that carry out the calculation of gas consumption information.

Before referring specifically to FIG. 5, it will be noted that multiple accumulation intervals may pass before the controller 108 uses the values to generate the corrected gas consumption information. As a consequence, in step 412, when the values are stored, the values GN, TN and PN from each interval are correlated to each other within the memory. Thus for example, the GN value from an accumulation interval at 12:00 noon to 12:15 pm on January 1 is correlated to the TN value from 12:00 noon to 12:15 pm on January 1, as well as the PN value from that same time interval.

The controller 108 may perform the operations of FIG. 5 to generate corrected gas consumption values for every accumulation interval, or may generate corrected gas consumption values every X accumulation intervals, where X is greater than 1.

Returning to FIG. 5, the steps of FIG. 5 would be performed from time to time during step 408 of FIG. 4, as would steps of other metering functions, not shown herein. In FIG. 5, it is assumed that M intervals (wherein $M \geq 1$) have passed since the last corrected gas consumption value was calculated.

In step 510, the controller 108 initiates DO-loop (i.e. a repeated process loop that repeats until a counter reaches a predetermined maximum) to perform steps 512, 514 and 516 M times. As a consequence, the subsequent sequence of steps 512, 514 and 516 are to be repeated for each accumulation interval that has been stored. In particular, steps 512, 514 and 516 are to be repeated for each accumulation interval n for n=1 to M.

In step 512, the processing circuit 30 calculates a correction factor based on the variance of the actual temperature, $T_n$, for the current accumulation interval, n, to the reference temperature TREF, and based on the variance of the actual pressure, $P_n$, for the current accumulation interval n to the reference pressure PREF. Specifically, the processing circuit 30 calculates a correction factor $C_n$ for the interval using the following equation:

$$C_n = (P_n/\text{PREF}) * (\text{TREF}/T_n),$$

where PREF is the reference pressure that is assumed to be the pressure when the original uncorrected gas volume calculations are made by the gas meter 14, and TREF is the reference temperature that is assumed to be the temperature when the original uncorrected gas volume calculations are made by the gas meter 14. In general PREF and TREF do not vary.

It is noted that $P_n$ and PREF must be in the same units, as must $T_n$ and TREF. To this end, PREF may be set equal to the number of pulses that the pressure sensor 18 would have produced in the corresponding accumulation time period if the pressure had actually been the reference pressure. Thus, if the pressure sensor 18 produces a pressure signal of fifty pulses per atmospheric pressure unit per minute, and the accumulation interval is fifteen minutes, then the value PREF would be would be equal to the reference pressures in atmospheric pressure units multiplied by fifty and then multiplied by fifteen. Similarly, the value TREF may be set equal to the number of pluses that the temperature sensor 16 would have produced in the corresponding time period if the temperature had actually been the reference pressure.

It will be appreciated, however, that the units of $P_n$, PREF, $T_n$ and TREF may be normalized in other ways.

After step 512, the processing circuit 30 executes step 514. In step 514, the processing circuit 30 increments the current total corrected gas volume value by the uncorrected gas volume value $G_n$ for the accumulation period n multiplied by the correction value $C_n$ for the accumulation period n. In other words, the processing circuit 30 determines:

$$GTOT = GTOT + (G_n * C_n)$$

The processing circuit 30 may then, in step 516, optionally erase the values $G_n$, $T_n$, and $P_n$ from memory after the new GTOT is determined. However, it may be desirable to track time of use of gas consumption over a particular period, in which case the stored values may be retained.

It will be appreciated that the mathematical operations in steps 512 and 514 may be split up or combined in other ways without departing from the spirit of the invention.

The above described embodiments are merely illustrative. Those of ordinary skill in the art may readily devise their own implementations and adaptations that incorporate the principles of the present invention and fall within the spirit and scope thereof. For example, at least some of the advantages of the invention may be obtained even if gas pressure is not used in the gas consumption calculation. It is possible that gas pressure varies less within gas conduits than temperature, and thus may be assumed to be the reference. In any event, correction for either gas or temperature variances is better than no correction at all.

I claim:

1. A metering arrangement, comprising:
a meter housing configured to be securely supported proximal to a facility receiving utility commodities;
a source of energy signals representative of electrical energy received by the facility;
a source of gas flow signals representative of gas flow through a gas conduit to the facility;
a source of temperature signals representative of a temperature corresponding to the gas conduit;
a processing circuit disposed within the meter housing, the processing circuit operably connected to the source of energy signals to receive energy signals therefrom, the processing circuit operably connected to the source of gas flow signals to received gas flow signals therefrom, the processing circuit operably connected to the source of temperature signals to receive temperature signals therefrom, the processing circuit operable to generate electrical energy consumption metering information from the energy signals; and
generate gas consumption information based on the received gas flow signals and the received temperature signals.

2. The metering arrangement of claim 1, wherein the processing circuit includes at least two processing devices.

3. The metering arrangement of claim 1, wherein the processing circuit further includes at least one AID converter.

4. The metering arrangement of claim 1, wherein source of gas flow signals further comprises a source of pulsed gas flow signals, each pulsed gas flow signal having a frequency that corresponds to a detected gas flow quantity.

5. The metering arrangement of claim 1, wherein source of temperature signals further comprises a source of pulsed temperature signals, each pulsed temperature signal having a pulse frequency that corresponds to a detected temperature.

6. The metering arrangement of claim 1 wherein the source of gas flow signals includes a gas meter having a gas measurement device and a display, the display providing visible information representative of the gas flow.

7. The metering arrangement of claim 1 further comprising a display supported on the meter housing and operably connected to the processing circuit, the display operable to provide visible information representative of energy consumption.

8. The metering arrangement of claim 1 wherein the processing circuit is further operable to
obtain an uncorrected gas volume value from the received gas flow signals;
obtain an average temperature value from the received temperature signals; and
generate corrected gas flow information at least in part by multiplying the uncorrected gas volume value by a second value that is equal to the ratio of the reference temperature to the average temperature value.

9. The metering arrangement of claim 8 wherein the uncorrected gas volume value is a number of pulses in the received gas flow signals over a first time period and the average temperature value is a second number of pulses in the received temperature signals over the first time period.

10. The metering arrangement of claim 1, wherein the processing circuit is further operably connected to a source of pressure signals to receive pressure signals therefrom, the processing circuit further operable to generate corrected gas flow information based on the received gas flow signals, the received temperature signals and the received pressure signals.

11. A metering arrangement, comprising:
a meter housing configured to be securedly supported proximal to a facility receiving utility commodities;
a source of energy signals representative of electrical energy received by the facility;
a first pulse signal input supported by the meter housing and operable to receive gas flow signals representative of gas flow through a gas conduit to the facility;
a second pulse signal input supported by the meter housing and operable to receive temperature signals representative of a temperature corresponding to the gas conduit;
a processing circuit disposed within the meter housing, the processing circuit operably connected to the source of energy signals to receive energy signals therefrom, the processing circuit further operably connected to the first pulse signal input and the second pulse signal input, the processing circuit operable to
generate electrical energy consumption metering information from the energy signals; and
generate corrected gas flow information based on signals received at the first pulse signal input and the second pulse signal input.

12. The metering arrangement of claim 11, wherein the processing circuit includes at least two processing devices.

13. The metering arrangement of claim 11 further comprising a display supported on the meter housing and operably connected to the processing circuit, the display operable to provide visible information representative of energy consumption.

14. The metering arrangement of claim 11, wherein the source of energy signals includes at least one current transformer.

15. The metering arrangement of claim 14, wherein the at least one current transformer is affixed to the housing.

16. The metering arrangement of claim 11, wherein the source of energy signals is supported by the housing.

17. A method, comprising:
providing to a processing circuit energy signals representative of electrical energy consumption, the processing circuit disposed within a meter housing;
providing to the processing circuit gas flow signals representative of gas flow through a gas conduit;
providing temperature signals to the processing circuit representative of a temperature corresponding to the gas conduit;
using the processing circuit generate electrical energy consumption metering information from the energy signals; and
using the processing circuit to generate gas consumption information based on the received gas flow signals and the received temperature signals.

18. The method of claim 17 further comprising:
employing a first routine in the processing circuit to accumulate gas consumption pulses;
employing a second routine in the processing circuit to accumulate temperature pulses;
employing a third routine in the processing circuit to generate gas consumption information based on the accumulated gas consumption pulses and the accumulated temperature pulses.

19. The method of claim 17 further comprising:
providing pressure signals to the processing circuit representative of atmospheric pressure of gas within the gas conduit; and
using the processing circuit to generate gas consumption information based on the received gas flow signals, the received temperature signals and the received pressure signals.

20. The method of claim 17 further comprising communicating the gas consumption information external to the meter housing.

* * * * *